United States Patent Office 2,945,827
Patented July 19, 1960

2,945,827

POLYETHYLENE COATED WITH WAX AND POLYSTYRENE OR POLYTETRAFLUOROETHYLENE AND PREPARATION OF CELLULAR ARTICLE THEREFROM

George E. Henning, Baltimore, Md., assignor to Western Electric Company, Incorporated, New York, N.Y., a corporation of New York No Drawing. Filed Jan. 5, 1956, Ser. No. 557,439

6 Claims. (Cl. 260—2.5)

This invention relates to plastic materials, especially electrical insulation, and methods of making the same, and more particularly to cellular plastic insulating materials and methods of making the same.

A relatively recent development in the electrical communications field has been the application of organic plastic materials in cellular form as insulating coverings for electrical conductors. Cellular polyethylene, in particular, possesses excellent electrical properties and has been found to be extremely useful in the manufacture of insulated conductors for multi-conductor communications cables. Cellular polyethylene can be readily extruded upon a filamentary conductor in a continuous extrusion process to form an insulating covering, the dimensions and properties of which can be maintained substantially uniform throughout.

By using cellular polyethylene as the insulating material for the conductors of a cable, the cable can be made smaller for the same attenuation than a cable in which, for example, paper insulation is employed, because the cellular polyethylene has a very low dielectric constant. Additional savings accrue due to the occlusion of relatively large amounts (e.g. 35% to 55% by volume) of a gas, such as elemental nitrogen or the like, in the cellular polyethylene, which results in a considerable reduction in the amount of polyethylene used. In consequence, the cost of cellular polyethylene insulation is competitive economically with that of conventional paper insulation.

Although cellular polyethylene is well suited as an insulating material for cable conductors because of its excellent electrical and mechanical properties, it is softer than cellular forms of other plastic insulating materials, such as cellular polystyrene. As a result cellular polyethylene insulating coverings on cable conductors possess less resistance to crushing and are more easily deformed than are some other cellular products when the insulated conductors are twisted into pairs in the course of fabricating a cable.

On the other hand, whereas cellular polystyrene possesses electrical properties that are substantially of the same order as those of cellular polyethylene, its use is limited because of its brittleness. The addition of plasticizers to polystyrene to overcome this defect has the detrimental effect of materially reducing its excellent electrical properties or adversely affecting its mechanical properties.

Manifestly, it would be desirable to insulate the individual conductors of a cable with an improved cellular plastic insulating material having electrical properties and mechanical properties substantially equivalent to those of cellular polyethylene, but possessing a somewhat greater hardness, so as to have increased resistance to crushing. Such cellular plastic insulation also should possess the ability to be bent sharply without cracking. No suitable material of this character has been available heretofore.

It is an object of this invention to provide new and improved plastic materials, especially electrical insulation, and methods of making the same.

It is another object of this invention to provide new and improved cellular plastic insulating materials and methods of making the same.

A composition suitable for use in the production of improved plastic material, which illustrates certain features of the invention, includes from about 90% to about 80% by weight of solid polyethylene in the form of cubes of the order of $5/16$ of an inch on a side. The surfaces of the cubes of polyethylene are coated with a thin film of microcrystalline wax which has a melting point between about 152° F. and about 156° F. A finely divided hardening plastic for polyethylene, having particle sizes of the order of about 60 mesh, is adhered to the polyethylene cubes by means of the film of wax in amounts from about 10% to about 20% by weight. The hardening plastic is selected from the group consisting of polystyrene and polytetrafluoroethylene.

The above-described composition may be mixed with a heat decomposable blowing agent, such as a micropowdered form of dinitroso-pentamethylene-tetramine, and extruded at elevated temperatures and pressures to form a cellular plastic article. The resultant cellular plastic article compares favorably with polyethylene with respect to electrical properties. The resultant cellular plastic article also possesses improved mechanical properties, such as increased hardness, in comparison with conventional cellular articles made of expanded polyethylene.

In accordance with the invention, an improved plastic insulating material may be made by introducing polyethylene in granular form, a hardening plastic having high dielectric strength, such as polystyrene, in a finely powdered form and a suitable heat decomposable blowing agent, such as a micropowdered form of dinitrosopentamethylene-tetramine, into the extrusion cylinder of a conventional screw-type plastics extruder such as that disclosed in the U.S. patent to Henning No. 2,535,286. Within the extrusion cylinder this mixture is worked severely and conditioned to an extrudable state before entering the extrusion die of the extruder.

In the vicinity of the extrusion die the temperature and pressure are controlled to facilitate the extrusion of the resultant plastic insulating material and to insure the formation of gas by decomposition of substantially all of the blowing agent.

The resultant plastic insulating material may be extruded in the form of a tubular covering upon a filamentary conductor. In such a case, the conductor is advanced continuously through the extrusion die of the plastics extruder, wherein a uniform, tubular covering of the resultant plastic insulating material is applied. After leaving the extrusion die, the extruded layer of plastic insulating material increases in size due to the expansion thereof by the sudden release of pressure, which allows the gas evolved by the decomposition of the blowing agent to expand. As a result, a multiplicity of minute, discrete, gas-filled cells are formed, which are distributed uniformly throughout the plastic insulating material forming the tubular covering on the conductor.

The improved plastic insulating material produced in this manner is uniform in composition and has electrical properties comparable with those of conventional cellular polyethylene insulated conductors. In addition, there is a marked increase in the hardness of the resultant insulating covering, whereby it has greater resistance to crushing and is less readily deformed than a conventional insulating covering of expanded polyethylene containing a like amount of occluded gas.

The increased hardness of the insulating covering produced in accordance with the invention is due to the presence of the hardening plastic, which is dispersed substantially uniformly in a matrix of cellular polyethylene, generally in an unfused or partially fused state, although some of it may be completely fused. It has been found that, as the proportion of hardening plastic to polyethylene in the composition is increased, the hardness of the extruded product is increased. Manifestly, if the percentage by weight of hardening plastic to polyethylene is increased sufficiently, the characteristics of the resultant extruded product begin to resemble more closely those of the pure hardening plastic in expanded form, in that the insulating covering becomes brittle and cannot be bent sharply without cracking. For the purpose of an insulating covering for a cable conductor in which polystyrene is the hardening plastic, the brittleness of the product becomes detrimental when the percentage of polystyrene exceeds about 50% by weight.

The following specific examples are included to illustrate the invention more fully:

Example I

In accordance with one specific embodiment of the invention, solid polyethylene in the form of granules (e.g. 5/16" cubes obtainable commercially) is heated to a temperature of approximately 175° F. in a conventional ribbon blender, such as size DU ribbon blender manufactured by the Robinson Mfg. Co., New York, N. Y. Polystyrene in a finely powdered form (e.g. approximately 60 mesh), likewise obtainable commercially, is introduced into the ribbon blender with the relatively larger sized polyethylene granules in the proportion of from about 10% to about 20% of polystyrene to from about 90% to about 80% of polyethylene by weight.

When the polystyrene and polyethylene are thoroughly mixed, a hot, molten, microcrystalline wax having a melting point of from about 152° F. to about 156° F. is added to the mixture in an amount sufficient to cover the surfaces of the polyethylene granules with a thin film of molten wax to which the fine particles of powdered polystyrene adhere. In this manner the powdered polystyrene is blended thoroughly with the polyethylene granules and is distributed uniformly upon the surfaces of the granules. In the subsequent handling of the mixture there is no danger of the finely powdered polystyrene sifting downwardly through the relatively much larger-sized granules of polyethylene so as to destroy the uniformity of the mixture, because the particles of polystyrene are stuck to the surfaces of the polyethylene granules by the wax film.

The resulting mixture of polyethylene and polystyrene is transferred from the ribbon blender to the feed hopper of a conventional, continuous plastics extruder, such as the above-mentioned extruder disclosed in the U.S patent to Henning No. 2,535,286, designed to apply a tubular insulating covering of the resultant plastic insulating material upon a continuously advancing filamentary conductor. From the feed hopper the mixture of polyethylene and polystyrene is fed to the interior of the extrusion cylinder simultaneously with an accurately metered amount of a micropowdered form of a blowing agent, such as dinitroso-pentamethylene-tetramine.

The blowing agent is metered into the extrusion cylinder at a rate dependent upon the desired percentage of expansion of the final product. Preferably the gas content of the final product is maintained within a range of from about 35% to about 65% by volume by adding the blowing agent in the proportions of from about 1% to about 2% by weight of the total mixture. At the extrusion die of the plastics extruder a temperature of from about 385° F. to about 400° F. is maintained to facilitate the uniform and continuous extrusion of the resultant plastic insulating material, and to insure the formation of gas by substantially complete decomposition of the blowing agent.

Example II

Since the particles of powdered polystyrene and the particles of a powdered form of a blowing agent, such as dinitroso-pentamethylene-tetramine, are of approximately the same order of size, it is possible to mix the powdered polystyrene and the powdered blowing agent together in desired proportions and to meter the resulting premix into the extrusion cylinder of the above-mentioned, conventional, plastics extruder simultaneously with the granules of polyethylene, which are fed from a feed hopper. The rate at which the premix of the polystyrene and blowing agent is to be metered into the extrusion cylinder will be dependent upon the percentage by weight of polystyrene and the expansion desired in the final product. Obviously, the ratio of the polystyrene to the blowing agent by weight will be dependent upon the volume of gas desired in the final product.

Example III

Polytetrafluoroethylene possesses electrical properties similar to those of both polystyrene and polyethylene and, as in the case of the polystyrene, it is a hardening plastic material which may be mixed in a finely powdered form with polyethylene granules in accordance with the methods described previously in connection with Examples I and II to produce an improved plastic insulating material. Since polytetrafluoroethylene increases the hardness of the finished product as its percentage by weight in the composition is increased, the percentage by weight of polytetrafluoroethylene preferably should not exceed about 50%.

Example IV

Since both polystyrene and polytetrafluoroethylene are hardening plastic materials in accordance with the teachings of this invention, mixtures of finely powdered polystyrene and polytetrafluoroethylene in various ratios by weight may be used in any of the preceding examples in the place of either finely powdered polystyrene or finely powdered polytetrafluoroethylene alone.

It will be understood that the specific examples hereinabove described are illustrative only and that the invention embraces all compositions and methods covered by the annexed claims.

Although the blowing agent mentioned in the above described examples is dinitroso-pentamethylene-tetramine, other suitable blowing agents, such as diazoamino benzene, may also be utilized with success. Organic blowing agents are preferred, because inorganic agents, such as ammonium carbonate, upon decomposition form ionizable residues which may adversely affect the insulating properties of the dielectric sheath. In the case of a solid blowing agent, such as dinitroso-pentamethylene-tetramine, it is desirable to use a highly comminuted form of the agent.

It will be understood that the creation of the gas-filled cells in the extruded product may be effected by means other than those mentioned hereinabove. For example, a suitable, normally gaseous, expanding medium under pressure may be introduced into the confined mass of plastic insulating material within the extrusion cylinder of a plastics extruder while the material is in a viscous fluid state. Methods and apparatus for injecting normally gaseous, expanding media of this type into thermoplastic materials in the manner suggested hereinabove are disclosed and claimed in copending application Serial No. 533,206, filed September 8, 1955 by Alvin N. Gray.

Examples of microcrystalline waxes which may be used in practicing processes like Example I are waxes derived from petroleum, which exist in the form of minute but clearly defined crystals. A suitable wax of this type is "Heliozone," a blend of microcrystalline waxes containing a small amount of paraffin, which melts at about 152° F. to about 156° F. This product is sold by E. I.

du Pont de Nemours and Company of Wilmington, Delaware. Another similar material is that sold by the Naugatuck Chemical Company, under the trade name "Sunproof." Other similar microcrystalline waxes may be employed, if desired. These microcrystalline waxes have such excellent electrical properties that there is no substantial deterioration of the electrical properties of the final product by virtue of the inclusion of such waxes.

Further, it will be understood that, although the plastic insulating materials made in accordance with the invention possess superior electrical and mechanical properties well suited for use as insulating coverings on cable conductors, such materials may also be used for other purposes in which such superior properties are beneficial. For example, the material may be extruded in the form of logs, strips or the like, for use as dielectric filler material.

What is claimed is:

1. A composite material suitable for use in the production of cellular plastic articles, said composite material consisting essentially of: from about 90% to about 80% by weight of solid polyethylene in the form of cubes of the order of 5/16" on a side; an amount of a microcrystalline wax sufficient to coat the surfaces of each cube of polyethylene with a thin film of the wax, the wax coating the cubes of polyethylene and having a melting point between about 152° F. and about 156° F.; and from about 10% to about 20% by weight of a finely divided hardening plastic for polyethylene, said hardening plastic being selected from the group consisting of polystyrene and polytetrafluoroethylene, being adhered to the polyethylene cubes by the film of wax, and having a particle size of the order of about 60 mesh.

2. The composite material according to claim 1, wherein the hardening plastic is polystyrene.

3. The composite material according to claim 1, wherein the hardening plastic is polytetrafluoroethylene.

4. The method of producing cellular plastic articles, which method comprises the steps of: admixing thoroughly from about 90% to about 80% by weight of solid polyethylene in the form of cubes of the order of 5/16" on a side with from about 10% to about 20% by weight of a finely divided hardening plastic for polyethylene, said hardening plastic being selected from the group consisting of polystyrene and polytetrafluoroethylene and having a particle size of the order of about 60 mesh; adding to the mixture of polyethylene and the hardening plastic a molten microcrystalline wax having a melting point between about 152° F. and about 156° F. in an amount sufficient to coat the surfaces of each cube of polyethylene with a thin film of the wax, so that a composite material is formed consisting essentially of the cubes of polyethylene coated with a thin film of the wax with the particles of the hardening plastic being adhered to the polyethylene cubes by the film of wax; mixing the composite material so formed with from about 1% to about 2% by weight, based on the total mixture, of dinitroso-pentamethylene-tetramine blowing agent in the form of particles having a particle size of the order of about 60 mesh; and extruding the resultant mixture of polyethylene, wax, hardening plastic, and dinitroso-pentamethylene-tetramine at an elevated temperature and pressure into the form of a cellular plastic article.

5. The method according to claim 4, wherein the hardening plastic is polystyrene.

6. The method according to claim 4, wherein the hardening plastic is polytetrafluoroethylene.

References Cited in the file of this patent

UNITED STATES PATENTS

| | | |
|---|---|---|
| 2,300,064 | Rosen et al. | Oct. 27, 1942 |
| 2,319,959 | Tierney | May 25, 1943 |
| 2,387,730 | Alderson | Oct. 30, 1945 |
| 2,479,919 | Flood | Aug. 23, 1949 |
| 2,485,691 | Bogese | Oct. 25, 1949 |
| 2,532,243 | Ott | Nov. 28, 1950 |
| 2,655,492 | Young et al. | Oct. 13, 1953 |
| 2,745,276 | Walker et al. | July 10, 1956 |
| 2,819,231 | Hahn et al. | Jan. 7, 1958 |

FOREIGN PATENTS

| | | |
|---|---|---|
| 529,649 | Great Britain | Nov. 26, 1940 |
| 613,018 | Great Britain | Nov. 22, 1948 |